(12) United States Patent
Maeda

(10) Patent No.: US 11,781,660 B2
(45) Date of Patent: Oct. 10, 2023

(54) MULTIPORT VALVE FOR WATER QUALITY ANALYZER

(71) Applicant: Shimadzu Corporation, Kyoto (JP)

(72) Inventor: Kazuma Maeda, Kyoto (JP)

(73) Assignee: Shimadzu Corporation, Kyoto (JP)

(*) Notice: Subject to any disclaimer, the term of this patent is extended or adjusted under 35 U.S.C. 154(b) by 0 days.

(21) Appl. No.: 17/041,375

(22) PCT Filed: Mar. 4, 2019

(86) PCT No.: PCT/JP2019/008352
§ 371 (c)(1),
(2) Date: Sep. 24, 2020

(87) PCT Pub. No.: WO2019/188011
PCT Pub. Date: Oct. 3, 2019

(65) Prior Publication Data
US 2021/0123537 A1    Apr. 29, 2021

(30) Foreign Application Priority Data

Mar. 27, 2018 (WO) .................. PCT/JP2018/012409

(51) Int. Cl.
*F16K 11/074*    (2006.01)
*G01N 30/20*     (2006.01)
*F16K 31/04*     (2006.01)

(52) U.S. Cl.
CPC .......... *F16K 11/0743* (2013.01); *G01N 30/20* (2013.01); *F16K 31/041* (2013.01); *G01N 2030/201* (2013.01); *G01N 2030/202* (2013.01)

(58) Field of Classification Search
CPC ... F16K 11/0743; F16K 31/041; G01N 30/20; G01N 2030/201; G01N 2030/202
See application file for complete search history.

(56) References Cited

U.S. PATENT DOCUMENTS 3,297,053 A * 1/1967 McKinney .......... F16K 11/0743
                                                137/625.46
3,384,118 A * 5/1968 Heintz .................. F02M 41/02
                                                137/625.21

(Continued)

FOREIGN PATENT DOCUMENTS

CN    2830828 Y    10/2006
CN    2854257      1/2007

(Continued)

OTHER PUBLICATIONS

Non-Final Rejection for Reexamination dated Mar. 18, 2021 for corresponding Taiwanese Patent Application No. 108104832.

(Continued)

*Primary Examiner* — Matthew W Jellett
*Assistant Examiner* — Christopher D Ballman
(74) *Attorney, Agent, or Firm* — Muir Patent Law, PLLC

(57) ABSTRACT

A multiport valve used for a water quality analyzer is provided with: a valve head having a plurality of ports for receiving pipings for connections therebetween, the ports being provided on an outer surface of the valve head, the valve head including a connection surface in which ends of flow paths communicating with the respective ports are arranged in the same plane, the valve head being made of a resin material having corrosion resistance against a chemical used in the water quality analyzer; a rotor having a flat surface provided with a groove for switching a connection state between the ends of the flow paths arranged on the connection surface, the flat surface being arranged so as to face the connection surface; and a drive mechanism configured to rotate the rotor.

10 Claims, 3 Drawing Sheets

(56) References Cited

U.S. PATENT DOCUMENTS

| | | | | |
|---|---|---|---|---|
| 3,426,796 | A * | 2/1969 | Vanderlaan | F02M 41/16 137/625.21 |
| 3,533,295 | A * | 10/1970 | Vesper | G01N 30/20 251/62 |
| 3,752,167 | A * | 8/1973 | Makabe | F16K 11/0743 137/625.41 |
| 4,156,437 | A * | 5/1979 | Chivens | F16K 11/0743 137/554 |
| 4,243,071 | A * | 1/1981 | Shackelford | G01N 30/20 137/625.46 |
| 4,444,066 | A * | 4/1984 | Ogle | G01N 30/20 73/61.56 |
| 5,419,208 | A * | 5/1995 | Schick | F16K 11/085 137/625.17 |
| 5,441,071 | A | 8/1995 | Doherty et al. | |
| 6,202,698 | B1 * | 3/2001 | Stearns | F16K 11/22 137/595 |
| 6,267,143 | B1 * | 7/2001 | Schick | G01N 30/20 137/625.11 |
| 6,415,670 | B1 * | 7/2002 | Ohkura | B01D 15/14 73/61.56 |
| 7,308,908 | B2 * | 12/2007 | Keene | F16K 11/07 137/554 |
| 9,063,114 | B2 * | 6/2015 | Wiechers | F16K 31/041 |
| 9,400,265 | B2 * | 7/2016 | Wiechers | F16K 11/0743 |
| 9,671,376 | B2 * | 6/2017 | Yasunaga | F16K 11/02 |
| 10,309,545 | B2 * | 6/2019 | Liang | F16K 11/074 |
| 2009/0071341 | A1 | 3/2009 | Takemasa et al. | |
| 2010/0276617 | A1 * | 11/2010 | Yasunaga | F16K 25/005 251/129.11 |
| 2010/0281959 | A1 * | 11/2010 | Berndt | G01N 30/20 73/61.56 |
| 2011/0006237 | A1 * | 1/2011 | Tower | F16K 11/0743 251/304 |
| 2011/0061404 | A1 * | 3/2011 | Ishizuka | F25B 9/14 62/6 |
| 2013/0284959 | A1 * | 10/2013 | Hochgraeber | F16K 25/005 251/129.11 |
| 2014/0360605 | A1 | 12/2014 | Tanaka | |
| 2016/0025690 | A1 | 1/2016 | Yasunaga | |
| 2016/0082439 | A1 | 3/2016 | Servin | |

FOREIGN PATENT DOCUMENTS

| | | |
|---|---|---|
| CN | 105026810 A | 11/2015 |
| CN | 106382391 A | 2/2017 |
| JP | 48-25722 | 7/1973 |
| JP | 2005-9994 A | 1/2005 |
| JP | 2018036084 A | 3/2018 |
| WO | 2013/069401 A1 | 5/2013 |

OTHER PUBLICATIONS

Decision from the Taiwanese Patent Office for application TW 108104832 dated Jun. 19, 2020.

1st OA from the Taiwanese Patent Office for application TW 108104832 dated Nov. 11, 2019.

Written Opinion for PCT application PCT/JP2019/008352 dated May 21, 2019, submitted with a machine translation.

Extended European Search Report dated Dec. 3, 2021 for the corresponding European Patent Application No. 19778397.0-1015 issued by the European Patent Office.

First Office Action dated Nov. 2, 2021 for the corresponding Japanese Patent Application No. 2020-509750 issued by the Japanese Patent Office.

First Office Action dated Oct. 11, 2021 for the corresponding Chinese Patent Application No. 201980018606.9 issued by the Chinese Patent Office.

Second Office Action dated Feb. 7, 2022 for the Chinese Patent Application No. 201980018606.9 from the Chinese Patent Office.

Second Office Action dated Mar. 22, 2022 for the Japanese Patent Application No. 2020-509750 from the Japanese Patent Office.

All About Fittings: A Practical Guide to Using and Understanding Fittings in a Laboratory Environment, by John W. Batts, IV, IDEX Health and Science, Jul. 2003.

First examination report dated Jun. 26, 2023 issued by the European Patent Office for the corresponding European Patent Application No. 19778397.0-1015.

* cited by examiner

MULTIPORT VALVE FOR WATER QUALITY ANALYZER

TECHNICAL FIELD

The present invention relates to a multiport valve used for a water quality analyzer.

BACKGROUND OF THE INVENTION in a water quality analyzer, processing, such as, e.g., collection of a sample, suction of a reagent, addition of a reagent to a sample, delivery of a sample to an oxidation reaction section, and delivery of the sample to a measurement section, is performed using a syringe pump. The processing is performed by switching the flow paths communicating with the syringe pump by a multiport valve (see Patent Document 1).

A highly corrosive reagent, such as, e.g., strong acid and strong alkali, is frequently used in a water quality analyzer. Therefore, all of the components configuring the water quality analyzer that come into contact with a reagent must be configured by a material having corrosion resistance against a reagent. For this reason, in a multiport value for a water quality analyzer is configured such that the metallic portions do not come into contact with a reagent.

Specifically, a multiport valve is composed of a valve body, a valve head, a rotor, a stator, etc. The valve head is a metallic member attached to the tip of the valve body. The valve head is provided with a plurality of female threaded holes for securing piping. The stator is assembled to the valve head and has flow paths therein to communicate with piping connected to the female threaded holes of the valve head. The rotor includes a groove for communicating between flow paths formed in the stator to switch the flow paths of the stator by rotating while sliding with the stator.

PRIOR ART DOCUMENT

Patent Document

Patent Document 1: Japanese Unexamined Patent Application Publication No. 2013-015387

SUMMARY OF THE INVENTION

Problems to be Solved by the Invention

In a multiple port valve used for a water quality analyzer, to prevent highly corrosive chemicals from coming into contact with a metallic valve head, the piping is fixed to the female threads in a state in which the tip end of the piping is pressed against the stator with a strong force to seal the connecting part between the flow path and the stator. With the structure, the tip ends of the plurality of piping are pressed against the stator from a plurality of directions. In particular, when the stresses are uneven, the stator may be deformed or the ferrule attached to the tip of the piping may be deformed, resulting in a liquid leakage in the multiple port value.

When a liquid leakage occurs in the multiport valve, the metallic valve head may corrode or rust, causing problems such as poor water sampling, crystallization of the reagent, and sticking of joint components. This may cause the stator to stick to the valve head. In the worst case, it becomes impossible to replace the stator.

Therefore, the present invention aims to prevent a liquid leakage in a multiport valve due to stresses being applied from a plurality of directions to a stator.

Means for Solving the Problem

A multiport valve used for a water quality analyzer according to the present invention is provided with:

a valve head having a plurality of ports for receiving pipings for connections therebetween, the ports being provided on an outer surface of the valve head, the valve head including a connection surface in which ends of flow paths communicating with the respective ports are arranged in the same plane, the valve head being made by a resin material having corrosion resistance against a chemical used in the water quality analyzer;

a rotor having a flat surface provided with a groove for switching a connection state between the ends of the flow paths arranged on the connection surface, the flat surface being arranged so as to face the connection surface; and a drive mechanism configured to rotate the rotor.

That is, in the multiport valve for a water quality analyzer according to the present invention, the tip end of the piping is not configured to be pressed against the stator. The valve head is configured by a material having corrosion resistance and piping is connected to the flow paths provided in the valve head. In short, in the multiport valve for a water quality analyzer according to the present invention, it is not configured such that the ends of piping are pressed against the stator from a plurality of directions.

In the present invention, the stator fixed to the valve head side may be interposed between the flat surface of the rotor formed with the groove and the connection surface of the valve head.

In the above-described case, in cases where the rotor and the stator are configured by the same material, the sliding surfaces thereof may sometime be polished and adhered to each other, resulting in adhesion of the rotor and the stator. Therefore, the rotor and the stator may be configured by materials different in hardness from each other. This configuration can prevent the adhesion of the rotor and the stator. Further, one of the rotor and the stator is configured by a material softer than the other, so that the one configured by a softer material is elastically deformed, which improves the sealing performance between them.

In the present invention, no stator may be interposed between the valve head and the rotor. That is, the flat surface of the rotor in which the groove is formed may be in direct contact with the connection surface of the valve head.

In the above-described case, the rotor may be configured by a resin material softer than the valve head. With this configuration, the rotor is more easily worn than the valve head due to the sliding between the valve head and the rotor, which can suppress the wear of the valve head.

A fluorine resin may be used as the material of the valve head. As the fluorine resin, polytetrafluoroethylene (PTFE) and polychlorotrifluoroethylene (PCTFE) can be exemplified.

The stator fixed to the valve head side may be interposed between the flat surface of the rotor in which the groove is formed and the connection surface of the valve head. In that case, at least one of the rotor and the stator may be configured by a resin material. In this configuration, the resin material is easily elastically deformed, so the sealing between the rotor and the stator can be enhanced.

In the above-described cases, the material of the rotor may be a fluorine resin.

Further, the material of the stator may be a fluorine resin

Effects of the Invention

In the multiport valve for a water quality analyzer according to the present invention, the valve head is configured by a material having corrosion resistance and piping is connected to the flow paths provided in the valve head. Therefore, the stator is not configured to be pressed by the tip ends of piping from several directions, and consequently, no liquid leakage occurs due to such a configuration.

EMBODIMENTS FOR CARRYING OUT THE INVENTION

Figure 1:
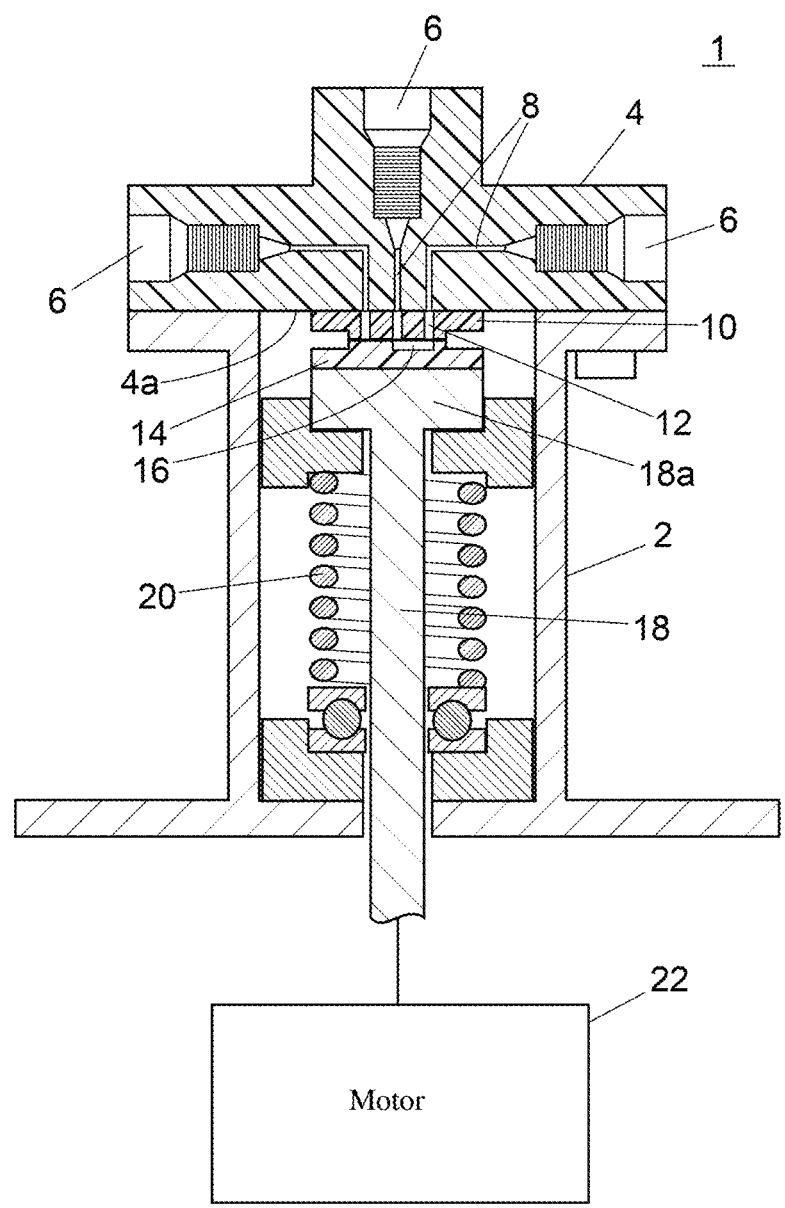
FIG. 1 is a cross-sectional configuration diagram showing an example of a multiport valve for a water quality analyzer.

Hereinafter, an embodiment of a multiport valve for a water quality analyzer will be described with reference to the attached drawings.

A multiport valve 1 for a water quality analyzer according to one example is provided with a valve body 2 and a valve head 4. The valve head 4 is attached to the tip end of the valve body 2. A plurality of ports 6 is provided on the outer surface of the valve head 4. Each port 6 is a female screw hole for connecting piping to the outer surface of the valve head 4. The plurality of ports 6 is in communication with the respective flow paths 8 formed in the valve head 4, and the ends of the flow paths 8 are arranged on the flat surface 4a of the valve head 4 forming the rearmost surface of the inner space of the valve body 2. The flat surface 4a of the valve head 4 forms a connection surface in which the ends of the flow paths 8 communicating with the respective ports 6 are arranged on the same plane.

The stator 10 is attached to the flat surface 4a of the valve head 4. The stator 10 is interposed between the valve head 4 and the rotor 14, which will be described later, to slide with the rotor 14. The stator 10 has through-holes 12 at positions corresponding to the ends of the flow paths 8 provided on the flat surface 4a.

In the valve body 2, the rotor 14 is held at the tip end portion 18a of the rotor shaft 18. The rotor 14 has a flat surface facing the flat surface 4a of the valve head 4, and a groove 16 for communicating between the ends of the respective flow paths 8 is formed on the flat surface. The rotor 14 is provided a flat surface in which the groove 16 is formed, and the flat surface is in contact with the stator 10. The rotor 14 rotates in accordance with the rotation of the rotor shaft 18 while sliding with the stator 10 to switch between the ends of the flow paths 8 to communicate them.

The rotor shaft 18 is biased toward the valve head 4 side by an elastic member such as a coil spring, thereby constantly pressing the rotor 14 against the stator 10. The rotor shaft 18 is rotated by a stepping motor 22. The rotor shaft 18 and the stepping motor 22 form a drive mechanism for rotating the rotor 14.

In the multiport valve 1 for a water quality analyzer of this example, at least the valve head 4, the stator 10, and the rotor 14 are configured by a material having corrosion resistance against a reagent that can be used in a water quality analyzer. As such materials, PPS (polyphenylene sulfide), PEEK (polyether ether ketone), PTFE (polytetrafluoroethylene), PCTFE (polychlorotrifluoroethylene), and ceramics, can be exemplified.

Figure 3:
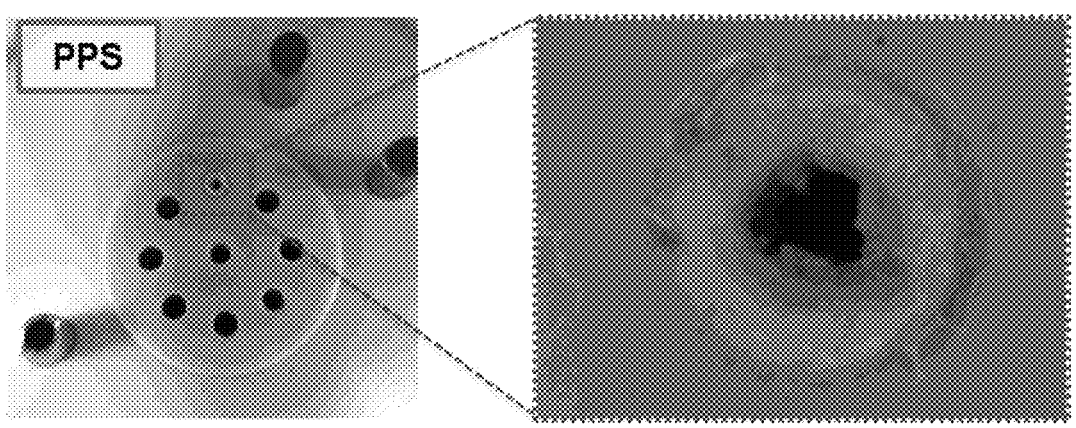
FIG. 3 is an image showing a state of flow paths when a valve head made of PPS has been used for a long time.
Figure 4:
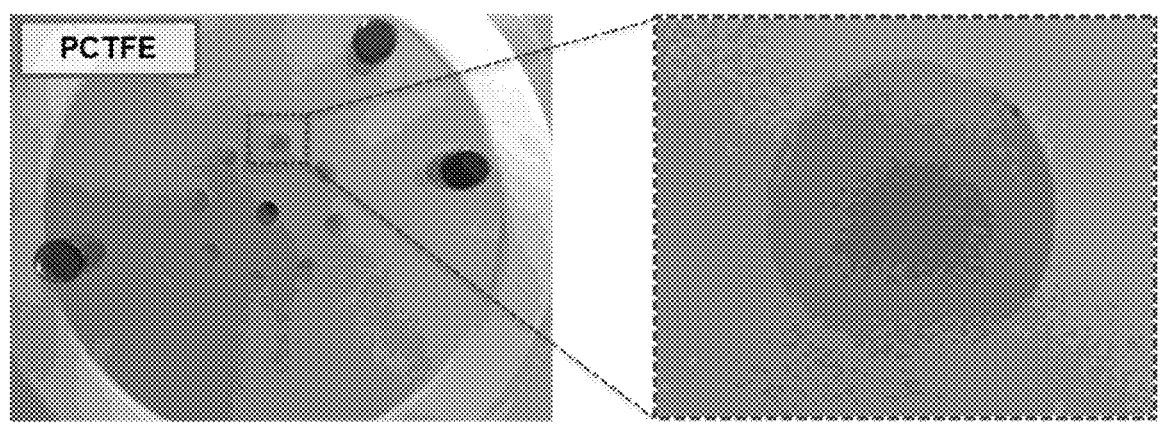
FIG. 4 shows a state of flow paths when a valve head made of PCTFE has been used for a long time.

In particular, by using a fluorine resin, such as, e.g., PTFE and PCTFE, as the corrosion resistance material, it is possible to prevent flow path closure due to rust, dissolution and/or erosion of the material. The present inventor verified the durability of the valve head 4 when PPS was used as the material for the valve head 4 and when PCTFE was used as the material for the valve head 4. When the valve head 4 made of PPS was used for a long time, as shown in FIG. 3, blockage of a flow path formed in the valve head 4 occurred. In contrast, even when the valve head 4 made of PCTFE was used for a long time, as shown in FIG. 4, no blockage of the flow paths formed in the valve head 4 occurred. Therefore, when a fluorine resin, such as, e.g., PCTFE, is used as the material for the stator 10 and the rotor 14 in addition to the valve head 4, it is possible to effectively prevent flow path blockage due to melting and/or erosion of a material.

In particular, the valve head 4 is configured by a corrosion resistance material as described above, and therefore it is possible to flow chemicals with high corrosion resistance, such as, e.g., strong acid and strong alkali, through the flow paths 8 in the valve head 4. Therefore, there is no need to seal by pressing piping through which those chemicals flow against a member (e.g., stator) different from the valve head 4.

With such a structure, the sealing surfaces in the valve 1 are limited to the plane between the valve head 4 and the stator 10 and the plane between the stator 10 and the rotor 14, so that stress is applied only in a direction perpendicular to the sealing surfaces. That is, the fastening force of the joint for connecting piping acts only on the valve head 4, and no stress is applied from directions other than the direction perpendicular to the sealing surface in the valve 1.

Note that the stator 10 and the rotor 14 are preferably configured by materials different in hardness (e.g., ceramics and PEEK, etc.). With this configuration, the member configured by a softer material is elastically deformed, so the sealing between the stator 10 and the rotor 14 is improved. In particular, the rotor 14 is a replaceable consumable member, and therefore the rotor 14 is more preferably configured by a material (e.g., PEEK) softer than the stator 10.

Figure 2:
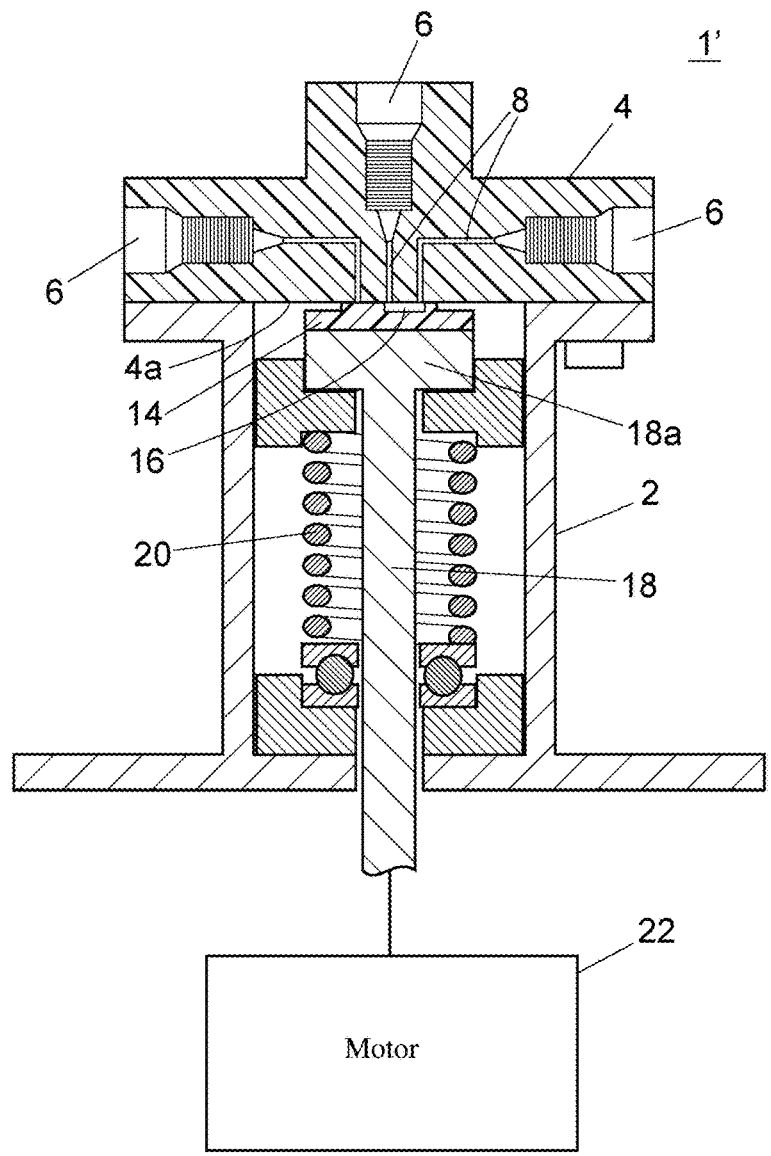
FIG. 2 is a cross-sectional diagram showing another example of a multiport valve for a water quality analyzer.

Note that as in the multiport valve 1' for a water quality analyzer shown in FIG. 2, without interposing a stator between the valve head 4 and the rotor 14, the rotor 14 may be in direct contact with the valve head 4. In this case, in order to suppress the wear of the valve head 4, the rotor 14 is preferably configured by a material softer than the valve head 4. For example, the valve head 4 may be configured by PPS and the rotor 14 may be configured by PEEK.

With the configuration as shown in FIG. 2, the sealing surface in the valve 1' is only the surface between the valve head 4 and the rotor 14, and the fastening force of the joint for connecting piping acts only on the valve head 4. Therefore, the stress is applied only in a direction perpendicular to the sealing surface of the valve 1'.

DESCRIPTION OF SYMBOLS 1, 1': Multiport valve for a water quality analyzer
2: Valve body
4: Valve head
6: Port
8: Flow path
10: Stator
12: Through-hole
14: Rotor
16: Groove
18: Rotor shaft
20: Elastic member
22: Stepping motor

The invention claimed is:

1. A multiport valve used for a water quality analyzer comprising:
   a valve head having a plurality of ports for receiving pipings for connections therebetween and flow paths communicating with the respective ports, the ports being provided on an outer surface of the valve head, the valve head including a connection surface in which ends of the flow paths are arranged in the same plane, the valve head being made of a resin material having corrosion resistance against a chemical used in the water quality analyzer;
   a rotor having a flat surface provided with a groove for switching a connection state between the ends of the flow paths arranged on the connection surface, the flat surface being arranged so as to face the connection surface;
   a drive mechanism configured to rotate the rotor; and
   a stator fixed to the valve head, the stator being interposed between the flat surface of the rotor formed with the groove and the connection surface of the valve head,
   wherein the rotor and the stator are made of materials different in hardness from each other,
   wherein the flow paths are configured so that chemicals flowing through the flow paths contact the resin material of the valve head, and
   wherein the resin material of the valve head is polychlorotrifluoroethylene.

2. The multiport valve used for a water quality analyzer as recited in claim 1,
   wherein the rotor is configured by a resin material softer than the valve head.

3. The multiport valve used for a water quality analyzer as recited in claim 1,
   wherein at least one of the rotor and the stator is configured by a resin material.

4. The multiport valve used for a water quality analyzer as recited in claim 3,
   wherein the resin material of the rotor is a fluorine resin.

5. The multiport valve used for a water quality analyzer as recited in claim 3,
   wherein the resin material of the stator is a fluorine resin.

6. The multiport valve used for a water quality analyzer as recited in claim 1,
   wherein the rotor and the stator are made of different resin materials from each other.

7. The multiport valve used for a water quality analyzer as recited in claim 1,
   wherein the plurality of ports are provided at positions to receiving pipings from directions parallel to the connection surface and from a direction perpendicular to the connection surface.

8. The multiport valve used for a water quality analyzer as recited in claim 1,
   wherein the stator has through holes each corresponding to each of the ends of the flow paths, and the valve head is configured so that the pipings received by the ports are fluidly connected with the through holes of the stator.

9. A multiport valve used for a water quality analyzer comprising:
   a valve head having a plurality of ports for receiving pipings for connections therebetween and flow paths communicating with the respective ports, the ports being provided on an outer surface of the valve head, the valve head including a connection surface in which ends of the flow paths are arranged in the same plane, the valve head being made of a resin material having corrosion resistance against a chemical used in the water quality analyzer;
   a rotor having a flat surface provided with a groove for switching a connection state between the ends of the flow paths arranged on the connection surface, the flat surface being arranged so as to face the connection surface;
   a drive mechanism configured to rotate the rotor; and
   a stator fixed to the valve head, the stator being interposed between the flat surface of the rotor formed with the groove and the connection surface of the valve head,
   wherein the rotor and the stator are made of materials different in hardness from each other,
   wherein the flow paths are configured so that chemicals flowing through the flow paths contact the resin material of the valve head, and
   wherein the resin material of the valve head is polyphenylene sulfide.

10. A multiport valve used for a water quality analyzer comprising:
    a valve head having a plurality of ports for receiving pipings for connections therebetween and flow paths communicating with the respective ports, the ports being provided on an outer surface of the valve head, the valve head including a connection surface in which ends of the flow paths are arranged in the same plane, the valve head being made of a resin material having corrosion resistance against a chemical used in the water quality analyzer;
    a rotor having a flat surface provided with a groove for switching a connection state between the ends of the flow paths arranged on the connection surface, the flat surface being arranged so as to face the connection surface;
    a drive mechanism configured to rotate the rotor; and
    a stator fixed to the valve head, the stator being interposed between the flat surface of the rotor formed with the groove and the connection surface of the valve head,
    wherein the rotor and the stator are made of materials different in hardness from each other,
    wherein the flow paths are configured so that chemicals flowing through the flow paths contact the resin material of the valve head, and
    wherein the resin material of the valve head is polyether ether ketone.

* * * * *